LIQUID-FUEL NUCLEAR-REACTOR-CORE WALL-AND-CHANNEL AND STRUCTURE

Filed June 1, 1966 2 Sheets-Sheet 1

INVENTORS:
Uri Gat
Stephan Schulze-Horn
Heinz Vornhusen

BY Karl F. Ross
Attorney

LIQUID-FUEL NUCLEAR-REACTOR-CORE WALL-AND-CHANNEL AND STRUCTURE
Filed June 1, 1966 2 Sheets-Sheet 2
Fig. 2
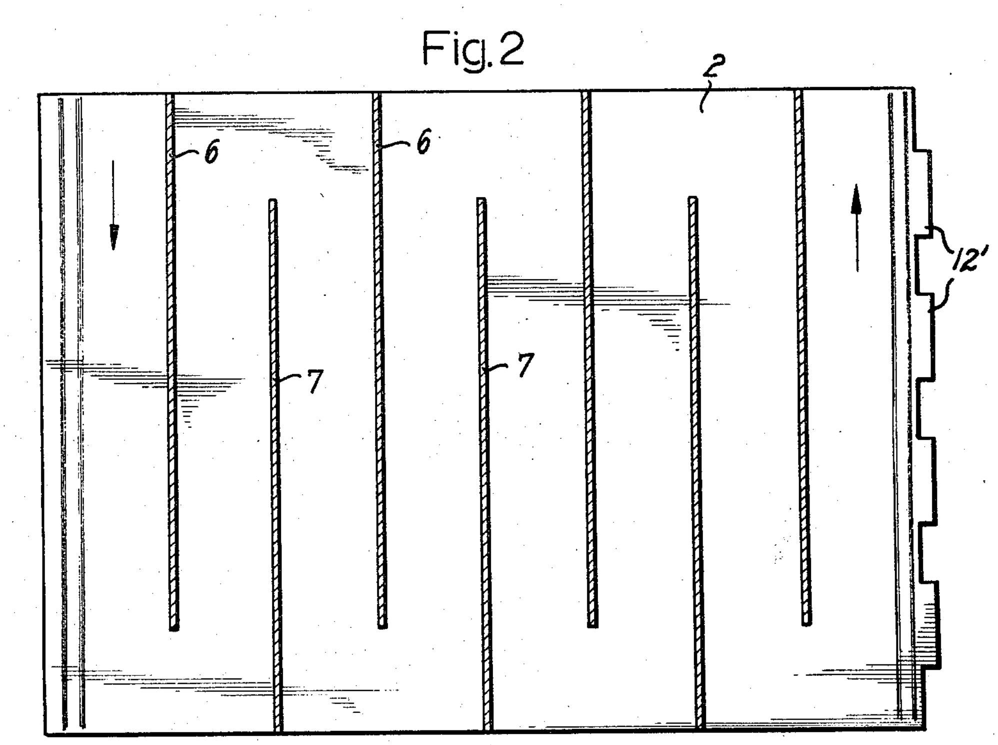
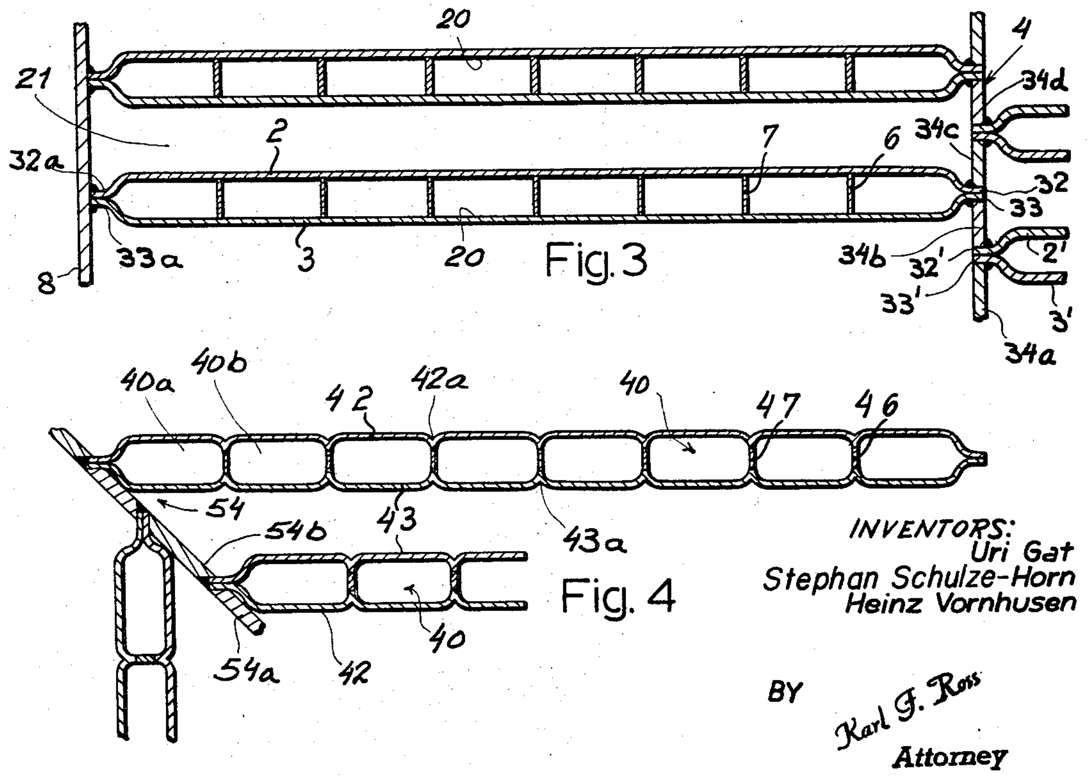
Fig. 3, Fig. 4
INVENTORS:
Uri Gat
Stephan Schulze-Horn
Heinz Vornhusen
BY Karl F. Ross
Attorney

United States Patent Office 3,410,340
Patented Nov. 12, 1968

1

3,410,340

LIQUID-FUEL NUCLEAR-REACTOR-CORE WALL-AND-CHANNEL STRUCTURE

Uri Gat, Julich, Stephan Schulze-Horn, Dortmund, and Heinz Vornhusen, Julich, Germany, assignors to Kernforschungsanlage Julich des Landes Nordrhein-Westfalen-e. V., Julich, Germany, a corporation of Germany Filed June 1, 1966, Ser. No. 554,401
Claims priority, application Germany, June 2, 1965, K 56,290
6 Claims. (Cl. 165—166)

ABSTRACT OF THE DISCLOSURE

A wall-and-channel structure for liquid-fuel circulation nuclear reactor cores in which generally parallel plates define respective liquid-flow compartments and are interconnected by vertical edge bands bridging the longitudinal edges of the successive pairs of plates to maintain them in spaced relationship, the bands being contiguous to form a substantially continuous wall defining further compartments between the compartments defined by each pair of plates. An intermediate band bridges the plates to form upwardly and downwardly extending channels in the chambers between each pair of plates defining a respective compartment. When the reactor is provided with a breeder blanket, a continuous wall extends transversely to the plates along other longitudinal edges to form a partition between the plates and the continuous wall.

Our present invention relates to a nuclear reactor core structure and, more particularly, to a core system for fission-type nuclear reactors having moving streams of fissionable material.

While it has been proposed heretofore to provide nuclear reactor systems with circulation of fissionable material through or within a reactor core adapted to contain a critical mass of the fissionable material, earlier efforts to achieve satisfactory results with solid (e.g. particulate) fissionable materials were found to be unavailing because of the complexity of the circulating system, the lack of homogeneity of the circulating flow, the problems of heat transfer, and the inability to main a precise regulation and monitoring of the circulation. In order to overcome these disadvantages, investigations have led to the use of liquid fissionable materials in circulation in or through the reactor core. Thus, one arrangement of this type provided circulation of a liquid fissionable material through a zone of the reactor core in which the critical mass of the fissionable material is attained and thence conveyed the fissionable material to a heat exchanger.

The liquid reactor fuel, i.e. the fissionable material, according to these proposals, can be constituted by a solution of the fissionable material in a suitable solvent and, for the purposes indicated, the solvent has generally been constituted as a molten-salt bath in which the fissionable material is solubilized as a salt. The fuel "cell" or core through which the fissionable material is circulated can be surrounded with a sheath of a fertile or breeder material which, in accordance with conventional nuclear reactor practice, can be irradiated by the particle flux generated in the fuel compartment and traversing the walls thereof to transmute the breeder material and convert it to a fissile substance. When breeder-material blankets are provided around the reactor core, they may be used to constitute part of the cooling medium for the fuel.

In circulating-fuel reactor cores operating with liquid fissionable materials (cf. Concise Encyclopedia of Nuclear Energy, Interscience Publishers, N.Y., 1962, pages 473–474, 713, 717–719; U.S. Patent No. 3,284,309 to

2

Murphree; and U.S. Patent No. 3,050,454 to Ball et al.), it has been the practice heretofore to provide tube bundles or nests through which the nuclear fuel is passed. It is found that the quantity of fuel required in such arrangements, per unit of particle flux, is proportionately large while cooling of the system is difficult especially in heterogeneous reactors having a coolant medium and a circulating fuel medium. The difficulties appear to reside in the inability to precisely determine how the cooling medium flows along the tubes within the tube bundle and the inability to regulate such flow at the inlet and outlet sides of the path in such manner as to provide a precisely controlled cooling action. Even when the cooling medium is passed transversely to the tube, significant disadvantages arise because of the substantial pressure drop in the cooling medium. Earlier systems, in which vertical plates have served as walls or partitions for channels alternately used for the fuel and the coolant, have likewise been unable to overcome the above-described difficulties with respect to control and uniformity, presumably because the throughflow of the media was not precisely controllable or the channels were of insufficient exactitude. Moreover, in such earlier systems, the friction loss upon contact of the liquid-fuel and coolant medium at the walls of the channels rendered the systems less than satisfactory. The pressure conditions within the reactor core also varied with temperature so that the flow cross-sections of the media varied without sufficient control and substantial pressure differentials, which could not be withstood adequately by the plates, were developed. For all of these reasons, the partitions within the reactor core used to define the liquid-fuel and coolant channels were incapable of performing at an optimum level and were, to a large measure, avoided by workers in the field.

It is, accordingly, the principal object of the present invention to provide an improved reactor-core assembly in which a circulation of liquid fuel can be carried out and wherein the disadvantages of earlier systems, as described above, can be avoided.

A more specific object of this invention is to provide a reactor core having channels for the throughflow of a liquid fuel medium and a coolant medium which is not subject to uncontrolled modification of the flow cross-section because of thermal stress, which is precisely controllable, which affords a substantially homogeneous and uniform flow of the media through the respective channels and which permits an especially intimate transfer of heat between the media while operating effectively with respect to the usable particle flux per unit mass of the fuel.

We have found that the aforestated objects can be achieved, in accordance with the present invention, in a reactor-core assembly composed of a plurality of vertical plates defining between them respective channels for the coolant and liquid fuel media when these plates are spaced apart by vertical thin metallic strips or bands extending at least along one edge but preferably both edges of the plates and bonded (e.g. by welding) thereto so that the edge strips and the plates form a partition wall extending transversely of the array of mutual parallel plates, while other strips are transversely spaced in parallel relationship between the plates at intermediate locations and are of a length less than that of the plates but vertically and alternately staggered to establish undulating passages within the compartments defined by each pair of spaced-apart plates. Preferably, the intermediate bands, which are likewise welded to the plates along vertical seams so as to reinforce the plate and eliminate the effects of any temperature differential between the compartments on opposite sides thereof, i.e. between the media, are disposed within the liquid-fuel compartments;

similar bands may be provided between the plates defining the coolant compartments as well. Thus the present invention eliminates the disadvantages of earlier liquid-fuel systems with a relatively meager increase in the amount of material used in forming the core while ensuring a throughflow of at least the liquid fuel through undulating passages extending alternately upwardly and downwardly along the plates, while ensuring considerable rigidity even when the edge bands, intermediate bands and the plates are thin so that a high particle flux can be sustained simultaneously with a high heat-transfer efficiency. Since the passages are reduced by the use of the intermediate plates to a limited width by comparison with the overall width of the plates defining the several compartments, a uniform throughflow of the liquid fissionable material is obtained and the control of such flow is greatly facilitated.

According to a more specific feature of this invention, the reactor-core assembly is employed in a breeder-reactor in which the spacer wall surrounding the core is welded to the edges of the plates and forms a breeder mantle which subdivides the fission zone from the breeder blanket of fertile material surrounding this zone. It has been common heretofore to form the fission zone as a substantially closed and pressurized vessel surrounded by a breeder blanket (cf. Concise Encyclopedia of Nuclear Energy, Interscience Publishers, N.Y., 1962, pages 88 and 89, 713) and, in these cases, it has hitherto been necessary to form the walls separating the breeder blanket from the fission zone of a sufficient thickness to withstand the pressures arising in the latter. With the system of the present invention, wherein the partition between the breeder zone and the fission serves as a spacer for the individual plates and is welded or otherwise fixed thereto, the partition may be substantially thinner since the plates act as reinforcing webs extending transversely to the continuous partition wall. Thus, in accordance with the present invention, the reduced thickness of the partition walls between the fission zone and the breeder zone reduces the absorption of the particle flux and promotes the transformation reaction of the fertile material outwardly of the fission zone. The significant neutron absorption of earlier partitions between the breeder blanket and the fuel is markedly reduced to the extent that it is rendered almost insignificant. The partition is, surprisingly, enabled to withstand the considerable pressures arising in the fission zone even though it is of substantially reduced thickness. Any tension forces or pressure effects applied to the plates defining the liquid-fuel and coolant compartments by the pressure within the reactor core are distributed over the relatively large number of closely spaced plates, thereby preventing damage to the partition wall or the core assembly.

Still a further feature of this invention resides in the provision of vertical lips upon the plates defining each of the liquid-fuel compartments along the edges thereof such that the lips or edge flanges extend toward and confront one another and can be welded together. In accordance with this aspect of the invention, the lips can constitute vertically spaced lateral projections of the paired plates which are received in corresponding cutouts of the partition walls and are welded thereto. This arrangement not only facilitates the joining of the plates to the spacer bands but also provides an additional assurance against deformation of the plates by any transverse stresses arising from pressure differentials between adjoining compartments. To prevent the temperature within the interior of the reactor core from becoming excessive, it has been found to be highly advantageous to provide at least the centrally disposed pairs of plates defining the liquid fuel compartment with inwardly extending vertical ridges integrally bent from the plates in confronting relationship with similar inwardly extending vertical ridges of the opposing plate and to dispose between each pair of juxtaposed ridges a respective one of the aforementioned intermediate webs or metal bands spanning the pair of plates. It has been found that such ridges facilitate the flow of the liquid fuel through the respective passages while improving the heat-transfer efficiency through the plates between the liquid-fuel compartment and the coolant compartment. Additionally, the ridges strengthen the plates against lateral deformation in the manner of corrugations and increase the ability of the plates to withstand transverse stresses.

The above and other objects, features and advantages of the present invention will become more readily apparent from the following description, reference being made to the accompanying drawing in which:

FIG. 2 is an elevational view of one of the plates of a liquid-fuel compartment of this assembly, with the intermediate spacers shown in vertical cross-section;

FIG. 3 is a horizontal cross-section through a portion of the assembly; and

FIG. 4 is a view similar to FIG. 3 of an arrangement suitable for use in the interior of the core at a location in which there is a tendency toward the development of elevated pressures or for use as an alternative to the arrangement of FIG. 2.

Figure 1:
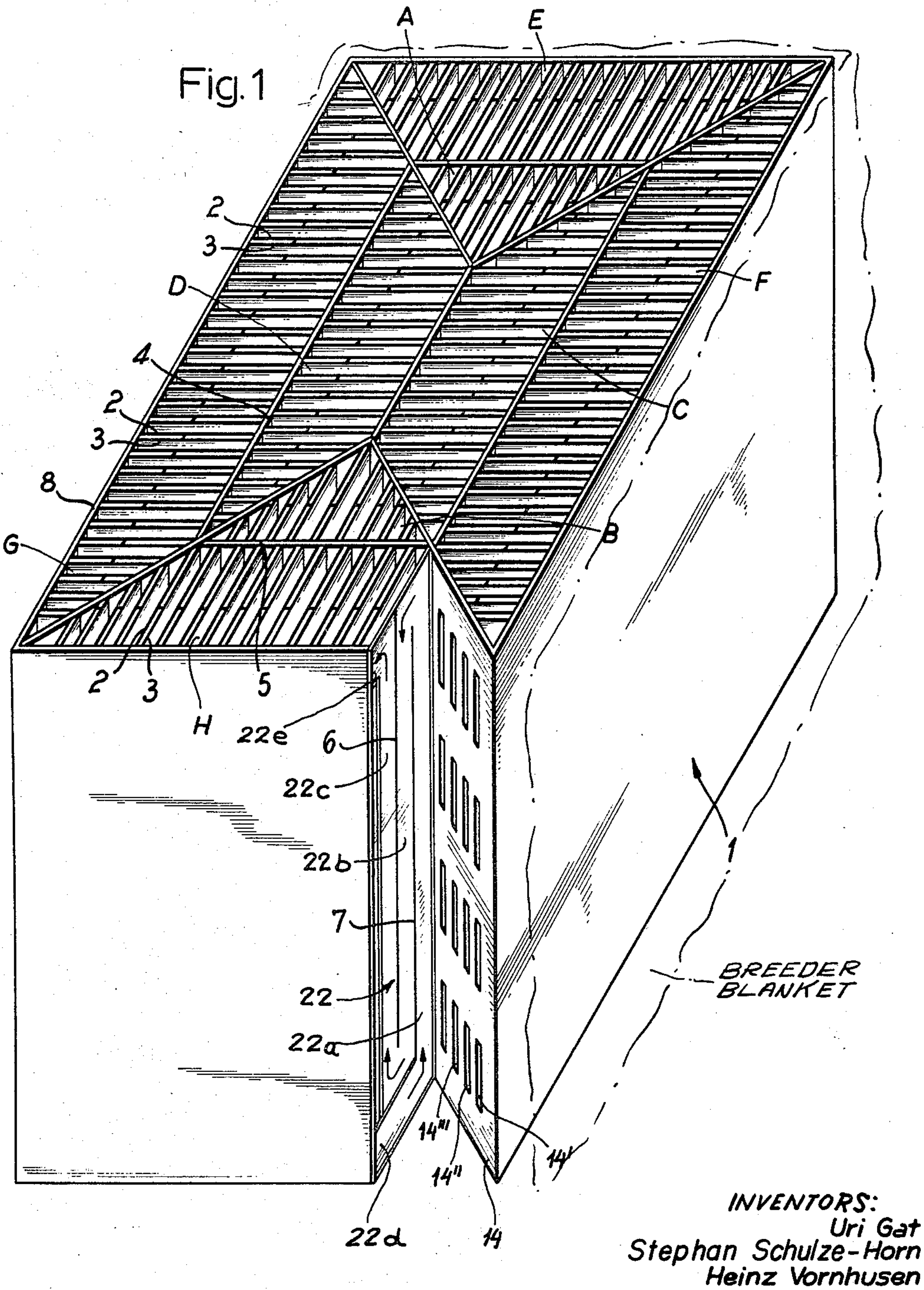
FIG. 1 is a somewhat diagrammatic perspective view of a reactor-core assembly embodying the present invention.

Referring initially to the overall view provided by FIG. 1, it will be seen that a reactor core in accordance with the present invention can provide a plurality of nested zones each having its arrays of plates 2 and 3; these plates define between them the liquid-fuel compartments and the coolant compartments as will be described in greater detail with reference to FIGS. 2–4. In the reactor core 1 of FIG. 1, a pair of generally prismatic end zones A and B are interfitted with a pair of trapezoidally prismatic zones C and D in the central region of the reactor core, the zones A–D being surrounded by outer trapezoidally prismatic zones E, F, G and H, the latter of which has been broken away. The control means for the core can be any of those conventional in liquid-fuel or circulating fuel reactors as described in the above-mentioned publications and others in the same field.

The spacing means forming the partitions 4 and 5 between these zones can, as illustrated in FIG. 1, comprise a vertical band of sheet metal 14 having vertical arrays of slot-like openings 14′, 14″, 14‴, etc. adapted to receive projecting lips 12′, etc. vertically spaced along the edges of the plate as, for example, illustrated in FIG. 2 where one of the plates 2 is shown in vertical elevation. The corresponding lips of a confronting plate 3 are joined to the lips 12′ and the longitudinal edges of the plates are welded together to form a liquid-fuel compartment 20 between each pair of plates. The joined lips 12′ of each pair of plates 2, 3 are received within the slots 14′ along the respective vertical line of the partition 14 and are welded into these slots and to the band 14 so that the latter serves as a spacer for the plates 2, 3 as well as the means defining with the adjoining pairs of plates coolant compartments such as is represented at 21 in FIG. 3. Within the liquid-fuel compartments 20 defined by each pair of plates 2, 3, we provide intermediate spacing strips 6 and 7 (see FIGS. 1 and 2) which are mutually parallel and extend vertically less than the height of the plates and are vertically staggered in alternating relationship so that a fluid passage 22 for the liquid fuel is provided. As can be seen from FIG. 1, this passage can include an upward strip **22*a*, a downward strip 22*b* and a further upward strip 22*c* through which the liquid fuel passes in succession. Inlet and oultet means, designated generally at 22*d* and 22*e***, are provided for each compartment and may communicate with the corresponding passages of other compartments or with a manifold for serial or parallel flow of the liquid fuel through the liquid fuel compartments in the conventional manner.

The throughgoing partitions 4, 5 can also be constituted, as illustrated in FIG. 3, by individual vertical strips 34*a*, 34*b*, 34*c*, and 34*d*, etc. which are welded to continuous lips 32 and 33 of the plates 2 and 3. In this system, the lips 32 and 33 do not have projections 12′ etc. as illustrated in FIG. 2 but are parallel to the metallic bands 34*a*, 34*b*, etc. and are welded thereto at respective vertical seams while being welded together to define the liquid-fuel compartments 20. Each strip 34*a*, 34*b*, etc. is disposed between the interconnected lips 32, 33 and 32′, 33′ of pairs of plates 2, 3 and 2′, 3′ extending transversely of the respective wall 4 in opposite directions away from the latter so that the liquid fuel compartments on opposite sides on each of the walls 4 and 5 are horizontally and transversely offset. In the arrangements of FIGS. 2 and 3, a larger number of the intermediate webs 6 and 7 are shown than has been illustrated in FIG. 1 and here the webs 6 and 7, in their alternately staggered relationship, subdivide the compartment 20 into eight strips extending alternately downwardly and upwardly.

Referring again to FIG. 1, it will be seen that the reactor core 1 is surrounded by a continuous breeder mantle which may be welded to the lips 32*a* and 33*a* of the plates 2 so that the latter reinforce the wall 8 which separates the fission zone from a surrounding breeder blanket illustrated in dot-dash lines and of the type described in the Concise Encyclopedia of Nuclear Energy, pages 88–89 and 713. The top and bottom plates of the reactor zone are likewise not illustrated in FIG. 1 and may be provided thereon in a manner similar to that by which the walls 8 are joined to the plates or can be formed by strips similar to those shown at 34*a*, 34*b*, etc. The breeder blanket can likewise be in the form of a liquid passing through similar plates 2 and 3 in further zones surrounding the wall 8. It will be immediately apparent that the compartment 20 defined between each pair of plates 2 and 3 is strongly reinforced by the webs 6 and 7 welded thereto and that the bands 14, 34*a–d*, etc. strengthen the compartments 21 for the coolant fluid to which excess and egress may be provided in the conventional manner, while the plates 2 and 3 themselves strengthen the walls 4 and 5 and partition 8 between the breeder zone and the fission zone. Thus, in spite of the fact that pressure differentials exist across all of the walls (since the fuel liquid, the breeder liquid and the cooling medium are at different pressures), these walls are capable of withstanding the pressure differentials in spite of the relative thinness.

In the system of FIG. 4, it can be seen that the walls 42 and 43, defining the liquid fuel compartments 40 between them, are provided with inwardly bent vertical ridges 42*a* and 43*a*, etc., confronting one another and joined together by the vertically staggered intermediate plates 46 and 47 which form the alternately upwardly and downwardly extending passages 40*a*, 40*b*, etc. Again, the plate assemblies 42 and 43 are separated by vertically extending bands 54*a*, 54*b*, etc. welded to the lips of the assemblies which are directed transversely to opposite sides of the wall 54 formed by the bands and the edges of the plates. In this case, as at the junction between the sections A–H of FIG. 1, the wall 54 extends transversely to the plates but lies in a vertical plane inclined to the plane of the plates while the plate assemblies 42, 43 on opposite sides thereof are at right angles to one another.

Other modifications of the arrangement of the plate assemblies will be readily apparent to those skilled in the art and are, of course, intended to be included within the spirit and scope of the appended claims.

We claim:

1. A wall-and-channel structure for a fluid-fuel nuclear-reactor core, said structure comprising a multiplicity of transversely spaced generally parallel plates defining respective liquid-flow compartments between them, at least one vertical metallic edge band extending transversely of said plates but connected to the longitudinal edges of respective confronting pairs of said plates to form with said edges a lateral wall and maintaining said plates in spaced relationship; and at least one generally parallel upright metallic intermediate band spanning the juxtaposed plates of some of said compartments and of a length less than the height of said plates for defining respectively in said compartments alternate upwardly and downwardly extending passages for a respective nuclear-core-operating liquid to be passed therethrough, both of the juxtaposed plates defining a respective compartment with one of said intermediate bands being provided with mutually confronting and interconnected vertical edges forming a seam, a plurality of said edge bands being disposed between the seamed edges of successive pairs of plates to define further compartments between said successive pairs of plates, said edge bands forming with said seamed edges a partition wall from which said pairs of plates extend alternately in opposite directions.

2. A wall-and-channel structure for a nuclear-reactor core as defined in claim 1 wherein said pairs of plates are inclined to said partition wall.

3. A wall-and-channel structure for a nuclear-reactor core as defined in claim 1 wherein each of the pairs of plates enclosing a respective intermediate band is provided with juxtaposed inwardly projecting vertical ridges and said intermediate band interconnects said ridges.

4. A wall-and-channel structure as defined in claim 1 for a nuclear-reactor core surrounded by a breeder blanket, said structure further comprising a continuous wall extending transversely to said plates along vertical edges thereof opposite said lateral wall and bonded to said opposite vertical edges for spacing said plates apart while forming a partition between said core and said breeder blanket.

5. A wall-and-channel structure for a nuclear-reactor core as defined in claim 1 wherein said edge band is provided with an array of vertically spaced slots extending along the respective edge of each of said plates and said respective edges are formed with vertically spaced lips projecting into said slots and welded therein.

6. A wall-and-channel structure for a nuclear-reactor core as defined in claim 1 wherein a multiplicity of transversely spaced intermediate bands corresponding to said intermediate band are provided in vertically staggered relationship in each compartment of said some of said compartments to form said passages respectively with a plurality of alternately upwardly and downwardly extending stretches.

References Cited

UNITED STATES PATENTS

| | | | |
|---|---|---|---|
| 3,105,807 | 10/1963 | Blake | 176—75 |
| 3,162,577 | 12/1964 | Redman | 176—33 |
| 3,284,309 | 11/1966 | Murphree | 176—45 |
| 1,750,850 | 3/1930 | Mantle et al. | 165—157 |
| 2,097,851 | 11/1937 | Wenzl | 165—166 |

FOREIGN PATENTS

| | | |
|---|---|---|
| 220,352 | 2/1957 | Australia. |
| 374,122 | 2/1964 | Switzerland. |
| 1,016,725 | 1/1966 | Great Britain. |

CARL D. QUARFORTH, *Primary Examiner.*

H. E. BEHREND, *Assistant Examiner.*